May 7, 1968  G. J. KLEIN ETAL  3,382,089
METHOD FOR PRODUCING DECORATIVE RETICULATED
COATINGS ON IMPERMEABLE SURFACES
Filed Sept. 3, 1964

INVENTORS
Gustave J. Klein
William P. O'Rourke
BY
Curtis, Morris + Safford
ATTORNEYS United States Patent Office 3,382,089
Patented May 7, 1968

3,382,089
METHOD FOR PRODUCING DECORATIVE RETICULATED COATINGS ON IMPERMEABLE SURFACES
Gustave J. Klein, Great Neck, and William P. O'Rourke, Babylon, N.Y., assignors to Knomark, Inc., Brooklyn, N.Y., a corporation of New York
Filed Sept. 3, 1964, Ser. No. 394,273
10 Claims. (Cl. 117—41)

ABSTRACT OF THE DISCLOSURE

The method of producing a decorative reticulated coating on an impermeable surface by applying thereto a volatile organic solvent in which a particulate inorganic solid having an average particle size below about 0.025 micron is dispersed by admixture, and then evaporating the solvent to leave visible discrete aggregates of the solid on the surface. An adhesive resin binder may be present in the solvent during formation of the coating or applied to the formed coating as a protective overcoat.

This invention relates to methods and compositions for the production of certain surface coatings, and to articles of manufacture having such surface coatings thereon. In particular, the present invention relates to methods and compositions for producing reticulated coatings on surfaces, and to articles of manufacture having such reticulated surface coatings thereon.

It has been found that by the application of a composition comprising a volatile solvent and a particulate reticulating agent to a surface, a decorative reticulated relief coating can be formed on the surface. The coating can be fixed or adhered to a substrate by inclusion of an adhesive binder in the composition, or by application of an adhesive over-coat to the decorated surface. Further, by the inclusion in such a composition of dyes soluble in said volatile solvent and/or pigments insoluble in said solvent, blending or contrasting color effects can be produced in the coating and/or surface. Although the reticulating compositions of the present invention can be applied to a surface by any conventional technique such as painting, spraying, dipping, etc., particularly good results and a high degree of convenience are achieved when the compositions are combined with a volatile propellant material and applied to a surface as an aerosol.

A better understanding of the present invention and of its many advantages will be had by referring to the accompanying drawing in which.

Figure 1:
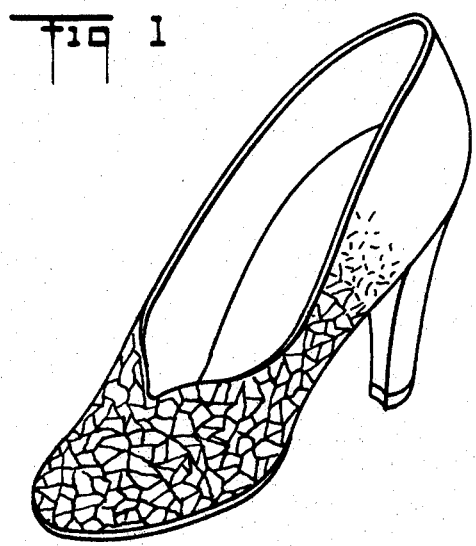
FIG. 1 shows an article of manufacture having thereon a decorative reticulated coating produced using the methods and compositions of the present invention.

In particular, FIG. 1 shows a ladies' shoe having thereon a decorative reticulated surface coating comprising "islands" of a pigmented material produced thereon by application of a coating composition according to the invention. As described later herein, the islands and the background on which they appear may be made of matching or contrasting colors by suitable choice of the color of the surface to which the coating composition is applied, and/or by suitable choice of pigments and/or dyes included in the composition.

Figure 2:
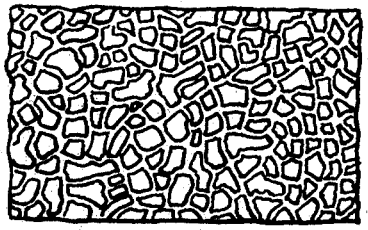
FIG. 2 is an enlarged view of a typical reticulated coating produced on a surface according to the invention.

FIG. 2 shows in greater detail the "islands" formed on a substrate by a decorative reticulating composition according to the present invention. The shape and distribution of the islands over the treated surface is essentially random, although the size of the islands can be controlled to some degree as hereinafter explained.

Figure 3:
FIG. 3 is a sectional view along line 2—2 of FIG. 2 showing the three-dimensional or relief effect of the coating of the present invention.

As shown in FIG. 3, the "islands" are raised to a greater or lesser extent above the level of the surface to which they have been applied. By the appropriate use of pigments and/or dyes, the islands can be well accentuated to the eye without any requirement or preference for a particular degree of island height. The height of the islands is generally variable with the nature of the surface treated, the amount of reticulating agent incorporated in the compositions of the invention, and on the nature and volatility of the fluid dispersing agent employed.

As mentioned earlier, the compositions of the present invention include a volatile solvent and a reticulating agent. If an adhesive binder is included, it is a material soluble in the volatile solvent. The nature of the binder is not critical to the production of a reticulated pattern, and is chosen rather to cause good adherence of the particulate reticulating agent to the treated substrate. Suitable resinous adhesive organic binders are well known in the coating arts, and include polyvinyl polymers such as polyvinyl chloride, polyvinyl acetate, polyvinyl pyrrolidone, cellulose esters and ethers such as nitrocellulose and cellulose acetate, various polyacrylic and polymethacrylic acid esters, vinylidene polymers such as polyvinylidene chloride, and the like.

As the volatile solvent materials, organic solvents having a boiling range as high as 80° C. are suitably employed. The solvents may be polar, e.g. ketones such as acetone and methylethyl ketone, or polar alcohols such as methanol, ethanol, and isopropanol. However, nonpolar solvents such as perchloroethylene, carbon tetrachloride, and mineral spirits can also be employed. The volatility of the solvent is suitably such that the coatings are tacky after 15–20 minutes drying at room temperature. In general, the more volatile the solvent, the larger will be the "islands" formed in the pattern. Slower removal of the solvent gives a finer reticulated pattern.

Dispersed in the volatile solvent is a reticulating agent comprising extremely fine particles of an inorganic material having an average particle size below about 0.025 micron. Inorganic oxides are particularly suitable, especially those which are free of color, i.e. are transparent or white appearing. A material which has proved of particular usefulness as a reticulating agent is colloidal silica having a particle size range of from about 0.015 to about 0.020 micron. A material of this nature sold under the trade name "Cab-o-sil" has a surface area as determined by nitrogen absorption of about 175–200 square meters per gram.

As mentioned earlier, pigments and/or dyes may also be combined in the reticulating compositions of the present invention. In particular, dyes soluble in the fluid dispersant phase will tend to color the surface areas of the articles to which the composition is applied, thus forming a background color for the raised islands formed by the reticulating agent. The use of pigments insoluble in the dispersant phase results in accumulation of the pigments in the islands of reticulating agent, with selective coloration of those islands in preference to distribution of the pigment phase over the background. Since dyes present in the dispersant phase will moisten and cannot be completely excluded from the solid phase comprising the reticulating islands, whereas insoluble pigments can be substantially completely excluded from the non-island portions of a decorative surface coating, it is preferred to employ a dark pigment in combination with a lighter dye when dyes and pigments are simultaneously employed. Any presence of the dye in the island phase in the resulting coating will then be masked by the stronger tone of the pigment.

A typical coating composition according to the invention is as follows:

| Component: | Parts by weight |
|---|---|
| Volatile solvent | 80–150 |
| Particulate reticulating agent | 3–10 |
| Adhesive binder (when added) | 15–45 |
| Pigments (when added) | Up to 15 |
| Dyes (when added) | Up to 15 |

If the adhesive binder is omitted, an overcoat of an adhesive resinous binder is suitably applied to prevent dislodging the reticulating agent from the coated substrate. The same adhesive binders can be employed in the composition or as overcoating agents.

As mentioned earlier, such compositions can be applied to a suitable surface by painting, dipping, spraying, or the like. The reticulated pattern forms on the surface as the volatile dispersant fluid evaporates, either at room temperature, or with the addition of heat if desired.

A particularly convenient mode of applying the compositions is in combination with a volatile propellant material of a type well known in the art. These propellant materials are generally halogenated hydrocarbons, often chlorinated, fluorinated, or fluorochlorinated saturated lower aliphatic hydrocarbons, or liquefied petroleum gases. Particularly suitable are the halogenated alkanes having one to four carbon atoms, preferably one or two carbon atoms, and at least one fluorine atom, often generically referred to as "fluorohydrocarbon propellants." Materials having a propellant vapor pressure between about twenty-five and sixty pounds per square inch at room temperature (20°–25° C.) are generally used and include, but are not limited to, dichlorodifluoromethane ("Freon 12"), dichlorotetrafluoroethane ("Freon 114"), trichloromonofluoromethane ("Freon 11"), and octafluorocyclobutane ("Freon C–318"), alone or in admixture. Other examples of suitable propellants are ethyl chloride, 1,1,1-trichloroethane, butane, isobutane, propane, etc. In general, the reticulating compositions above described are combined with a propellant material in a weight ratio of from 3:1 to 1:1.

The compositions of the present invention are best applied to a smooth surface. For example, decorative coatings can be produced on metal surfaces using the compositions of the present invention. When the material is employed on a porous surface, or on an uneven surface which would interfere with the drawing together of the reticulating agent and formation of islands during the drying of the coating composition, the surface is suitably first primed to render it smooth and/or less absorbent. Thus, for example, decorative coatings can be formed with the compositions of the present invention on an untreated wood substrate. However, if the wood is first made smooth and less permeable by the application of a priming material such as varnish or lacquer, the resultant coating is more uniform and pleasing to the eye. The compositions of the present invention are of particular interest for producing reticulated patterns on plastic surfaces, leather, and other coriaceous materials, and leather substitutes including plastic films. When used on porous surfaces such as leather, the surface is preferably first treated with a film-forming priming coat. The priming coat preferably comprises an adhesive resinous material soluble in the volatile solvent present in the coating composition and is suitably a material like those already mentioned for use as binders in the composition or as overcoating materials. The resins of the primary coat can be applied to a substrate in solution or as a dispersion in water or an organic liquid by spraying, dipping, painting, etc.

A better understanding of the present invention and of its many advantages will be had by referring to the following specific example, given by way of illustration.

Example 1

A coating composition suitable for producing decorative reticulating effects was prepared by combining 30 parts of a "Acryloid C–10–LV" polyacrylic acid ester resin binder (in 40 parts by weight of toluene) with 115.5 parts by weight of acetone, 8.0 parts of a paste comprising an insoluble pigment dispersed in the solvent-resin combination just mentioned, and 6.5 parts by weight of finely divided colloidal silica ("Cab-o-sil"). The resulting composition was then combined with 80 parts by weight of "Freon 12" as a propellant, and packaged in a container having a suitable pressure-actuated valve.

The resulting composition was applied by spraying, in the form of an aerosol, on the surface of a leather shoe previously primed by the application thereto of a latex comprising 35 percent of polyacrylic acid ester solids ("Rhoplex AC 34").

The highly volatile propellant is dispelled by evaporation almost instantaneously on release from the aerosol container. Similarly, the volatile acetone component of the composition evaporates rapidly from the surface of the leather onto which it has been sprayed. As the acetone is volatilized, the dispersed solid phase tends to agglomerate in discrete areas on the treated surface to form islands in which the pigment is entrapped. When dry, the pigmented islands are tightly adhered by the adhesive binder to the substrate material, and form an attractive decorative pattern in contrast to the background of the leather surface.

If more or less contrast is desired, one or more dyes soluble in the fluid dispersant phase employed can be included in the composition to make the background blend or contrast with the islands thereon.

The same coating composition was applied to an unprimed leather surface, to unprimed surfaces of wood and "Corfam," to a painted metal surface, to glass, and to primed surfaces of these materials as well as fabric, all with visible reticulation. These surfaces were primed with materials as diverse as nitrocellulose, acrylic ester resins, shellac, polyvinyl pyrrolidone, and polyvinyl acetate.

Although specific embodiments have been shown and described, it is to be understood that they are illustrative, and are not limiting on the scope and spirit of the present invention.

What is claimed is:

1. The method of making a reticulated decorative pattern on a smooth substantially impermeable surface by applying thereto a composition consisting essentially of 80 to 150 parts by weight of a volatile organic solvent in which are dispersed, by admixture therewith, from 3 to 10 parts by weight of particles of an insoluble metal oxide having an average particle size below about 0.025 micron, and then removing said volatile solvent by evaporation to leave visible discrete aggregates of said insoluble metal oxide on said surface to form said reticulated pattern.

2. The method as in claim 1 wherein said composition additionally includes 15 to 45 parts by weight of an adhesive resinous binder soluble in said solvent.

3. The method as in claim 1 wherein said composition is applied to said surface as an aerosol in combination with a volatile propellant selected from the group consisting of halogenated hydrocarbons and liquefied petroleum gases.

4. A method as in claim 1 wherein said composition contains a dye dissolved in said volatile solvent.

5. The method as in claim 1 wherein said composition contains an insoluble pigment dispersed therein.

6. The method as in claim 1 wherein said composition is applied to a porous surface pretreated with a resinous adhesive priming agent to render it smooth and substantially impermeable.

7. A method as in claim 1 wherein a coating of an adhesive resinous binder is applied over said reticulated decorative pattern on said surface.

8. The method as in claim 1 wherein said insoluble metal oxide is silica.

9. A method as in claim 5 wherein said composition contains a dye dissolved in said volatile solvent.

10. A method as in claim 6 wherein said porous surface is of leather.

References Cited

UNITED STATES PATENTS

| | | | |
|---|---|---|---|
| 2,126,321 | 8/1938 | Freudenberg et al. | 117—142 |
| 1,775,010 | 9/1930 | Werschky | 117—142 X |
| 2,298,152 | 10/1942 | O'Russa | 117—142 X |
| 2,431,873 | 12/1947 | Kennelly | 117—169 X |
| 2,570,490 | 10/1951 | Saums | 106—193 X |
| 2,612,456 | 9/1952 | Thacker et al. | 117—132 |
| 2,617,780 | 11/1952 | Lutz | 117—104 X |
| 2,684,915 | 7/1954 | Tinsley | 117—104 X |
| 2,763,577 | 9/1956 | Lawler | 117—142 X |
| 2,351,717 | 6/1944 | Soff | 117—37 |
| 2,833,661 | 5/1958 | Iler | 106—193 |
| 2,892,730 | 6/1959 | Kloepfer et al. | 106—193 |
| 2,982,033 | 5/1961 | Bingham | 36—45 X |

MURRAY KATZ, *Primary Examiner.*

WILLIAM D. MARTIN, *Examiner.*

T. G. DAVIS, *Assistant Examiner.*